United States Patent
Dry (10) Patent No.: US 10,086,730 B2
(45) Date of Patent: Oct. 2, 2018

(54) PASSIVE PRESSURE RECOVERY DEVICE FOR PASSIVE AIR SUSPENDED SEATS

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 15/279,167

(22) Filed: Sep. 28, 2016

(65) Prior Publication Data

US 2018/0086239 A1    Mar. 29, 2018

(51) Int. Cl.
*B60N 2/90* (2018.01)
*F16K 15/20* (2006.01)

(52) U.S. Cl.
CPC .............. *B60N 2/914* (2018.02); *F16K 15/20* (2013.01)

(58) Field of Classification Search
None
See application file for complete search history.

(56) References Cited

U.S. PATENT DOCUMENTS

| | | | |
|---|---|---|---|
| 3,605,145 A | 9/1971 | Graebe | |
| 3,652,126 A * | 3/1972 | Folling | A47C 7/467 297/284.6 |
| 3,982,786 A * | 9/1976 | Burgin | A47C 4/54 297/284.3 |
| 4,688,283 A | 8/1987 | Jacobson et al. | |
| 5,335,382 A * | 8/1994 | Huang | A43B 13/203 297/199 |
| 5,558,398 A * | 9/1996 | Santos | A47C 4/54 297/284.3 |
| 5,657,499 A * | 8/1997 | Vaughn | A61G 7/057 5/654 |
| 6,092,249 A | 7/2000 | Kamen et al. | |
| 8,720,473 B2 * | 5/2014 | Almeida | F15D 1/025 137/223 |
| 2001/0045104 A1 * | 11/2001 | Bailey, Sr. | A43B 1/0054 62/510 |
| 2003/0030319 A1 * | 2/2003 | Clapper | A47C 4/54 297/452.41 |
| 2007/0186349 A1 * | 8/2007 | Lipman | A47C 27/084 5/713 |
| 2010/0030124 A1 * | 2/2010 | Lande | A61M 1/16 604/5.04 |

* cited by examiner

*Primary Examiner* — David E Allred
(74) *Attorney, Agent, or Firm* — Vichit Chea; Price Heneveld LLP (57) ABSTRACT

A passive pressure recovery system for an air suspended seat includes a fluid tight support cell. A trim stock is disposed over the fluid tight support cell. A support block is disposed below the support cell. A fluid tight receiving cell is in fluid communication with the support cell and is configured to receive fluid from the support cell when a load is applied to the support cell. The pressure in the support cell is greater than the pressure in the receiving cell when a load is applied to the support cell. A check valve system is in fluid communication with the support cell and is configured to allow air to be drawn into the support cell when a load has been removed from the support cell.

16 Claims, 6 Drawing Sheets

PASSIVE PRESSURE RECOVERY DEVICE FOR PASSIVE AIR SUSPENDED SEATS

FIELD OF THE DISCLOSURE

The present disclosure generally relates to a vehicle seating assembly, and more particularly to a passive pressure recovery device for a passive air suspended seat for a vehicle seating assembly.

BACKGROUND OF THE DISCLOSURE

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE DISCLOSURE

According to one aspect of the present disclosure, a passive pressure recovery system for an air suspended seat includes a fluid tight support cell. A trim stock is disposed over the fluid tight support cell. A support block is disposed below the support cell. A fluid tight receiving cell is in fluid communication with the support cell and is configured to receive fluid from the support cell when a load is applied to the support cell. The pressure in the support cell is greater than the pressure in the receiving cell when a load is applied to the support cell. A check valve system is in fluid communication with the support cell and is configured to allow air to be drawn into the support cell when a load has been removed from the support cell.

According to another aspect of the present disclosure, a passive pressure vehicle seating assembly includes fluid tight support cells. A support block is disposed below each support cell. The vehicle seating assembly includes fluid tight receiving cells. A check valve system is configured to receive fluid from the support cells when a load is applied to the support cells. The pressure in the support cells is greater than the pressure in the receiving cells when a load is applied to the support cells.

According to yet another aspect of the present disclosure, a seating assembly includes a passive pressure recovery device having a fluid tight support cell disposed on a support block. The seating assembly includes a fluid tight receiving cell. A fluid line couples the support cell with the receiving cell. The receiving cell and the support cell are configured to be deflected simultaneously a similar distance when a load is applied, resulting in a greater pressure in the support cell than in the receiving cell.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 1A:
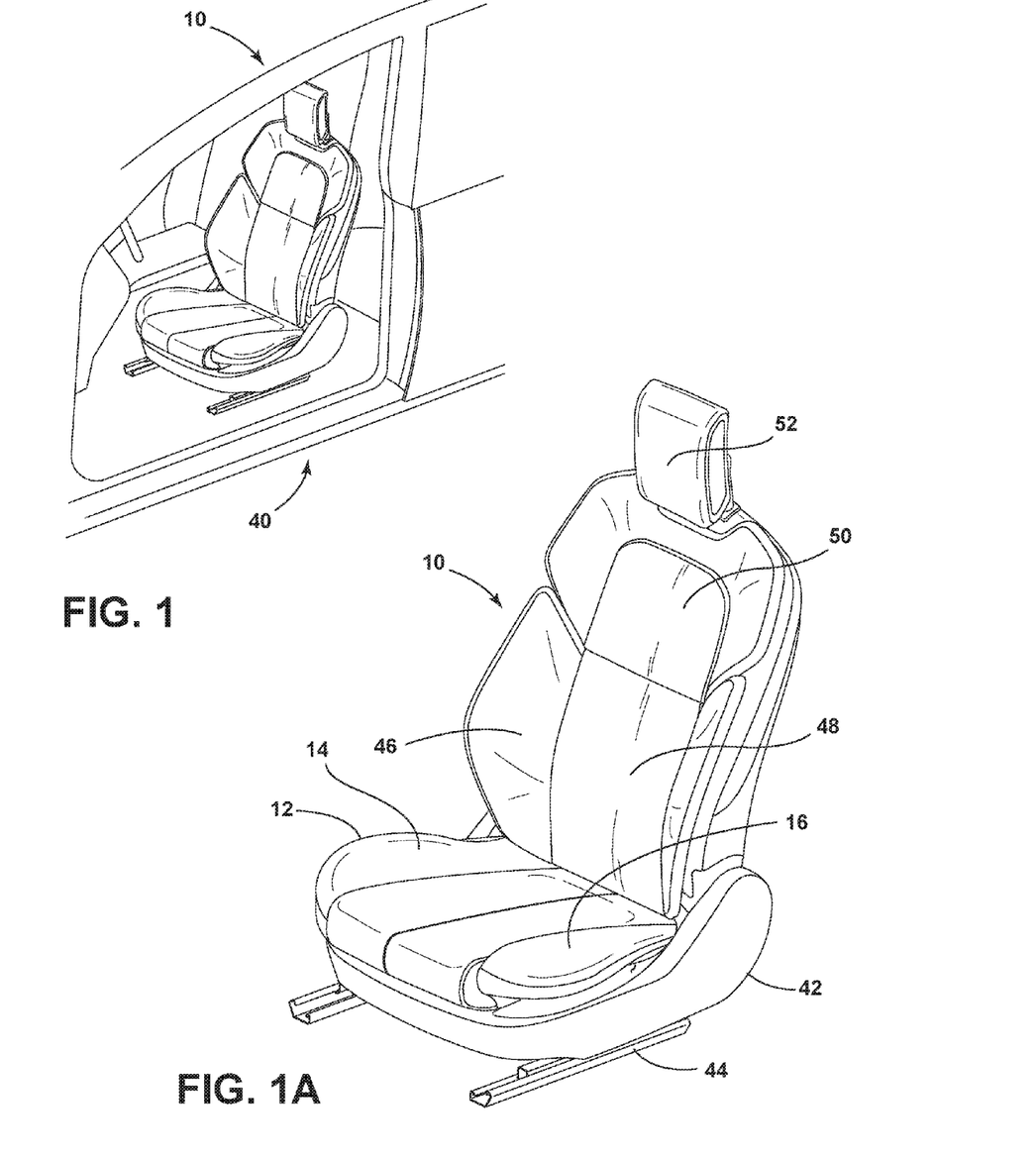
FIG. 1 is a top perspective view of one embodiment of a vehicle seating assembly of the present disclosure disposed in a vehicle.
FIG. 1A is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-8, reference numeral 10 generally designates a vehicle seating assembly having a passive pressure recovery system 11 for an air suspended seat 12 that includes a fluid tight support cell 14. A trim stock 16 is disposed over the fluid tight support cell 14. A support block 20 is disposed below the support cell 14. A fluid tight receiving cell 22 is in fluid communication with the support cell 14 and is configured to receive fluid from the support cell 14 when a load is applied to the support cell 14. The pressure in the support cell 14 is greater than the pressure in the receiving cell 22 when a load is applied to the support cell 14. A check valve system 30 is in fluid communication with the support cell 14 and is configured to allow air to be drawn into the support cell 14 when a load has been removed from the support cell 14.

Figure 2:
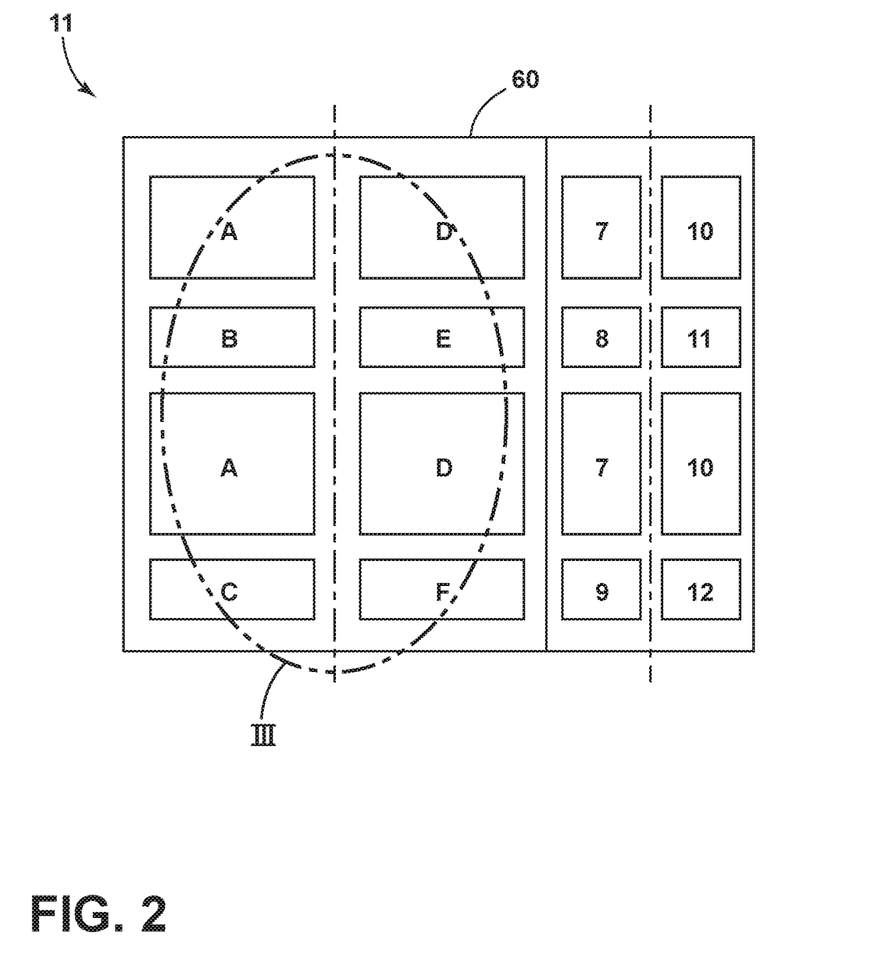
FIG. 2 is a schematic view of a vehicle seating assembly of the present disclosure.

With reference to FIGS. 1 and 2, the vehicle seating assembly 10 is illustrated for use in a vehicle 40, such as a car, a truck, a van, etc. It is also contemplated that the concept set forth in this disclosure may be utilized in a front or forward seat of the vehicle 40 as well as back or rearward seats of the vehicle 40. The vehicle seating assembly 10, as illustrated, includes a seat base 42 that is positioned on rail slides 44 to allow fore and aft movement of the vehicle seating assembly 10 relative to the vehicle 40. The air suspended seat 12 is positioned on a seat base 42 and is movable relative thereto, as set forth in further detail below. In addition, the vehicle seating assembly 10 includes a seatback 46 having a lower lumbar region 48 and an upper thoracic region 50 as well as a head restraint 52. Each of the components of the seatback 46 may be configured for adjustability to properly support the weight of various occupants inside the vehicle 40. For purposes of this disclosure, it will be understood that the support cells 14 may be disposed proximate a rear portion of the vehicle seating assembly 10 and the receiving cells 22 may be disposed at a forward portion of the vehicle seating assembly 10.

The passive pressure recovery system 11 as set forth herein is configured to provide a long-lasting air suspended seat that does not need power or recharging. Traditional seating assemblies that include air suspended seating features typically require a multi-layer resilient plastic sheet stock for upper and lower vacuum formed surfaces to achieve a maximum pressure loss of 25 percent over a 10-year period. However, a lower cost single layer sheet construction is possible if a passive air pressurization device is used to maintain system performance. The passive pressure recovery system 11 as set forth herein maintains air seat operation beyond a 10-year life. The vehicle seating assembly 10, and specifically the passive pressure recovery system 11, as set forth herein, includes a single layer of thermoplastic polyurethane (TPU), which can be repressurized, while maintaining minimal long term leakage of air. As set forth herein, the air supply is generally passive, such that no action is required by the occupant to monitor the system pressure or to activate repressurization. The passive pressure recovery system 11 operates silently and is generally undetectable to the occupant. In addition, the passive pressure recovery system is integrally formed within the body of an air suspended panel and supplies each air cell or air cell group in isolation relative to the remainder air cells or air cell groups. More specifically, there are multiple groups of cells in a passive air filled seating assembly. This enables the seat to fold flat, have increased seat stability, and include conformal thin seating sections that are comfortable to an occupant. The air supply is capped to provide the ideal target pressure of its receiving air cells. Each support cell 14 of the passive pressure recovery system 11, when compressed beneath an occupant, achieves an air pressure equal to 1.25 times the design pressure of the receiving air cells. The pressure overcomes a non-return valve to the receiving cells 22 until the pressure in the support cells 14 is 1.25 times the design pressure. Once the pressure in the support cells 14 reaches 1.25 times the design pressure, the passive pressure recovery system 11 will no longer be able to overcome the non-return valve. In addition, the passive pressure recovery system 11 is totally self-contained and self-functioning, such that no additional power or pressure is required external to the air suspended seat.

Figure 3:
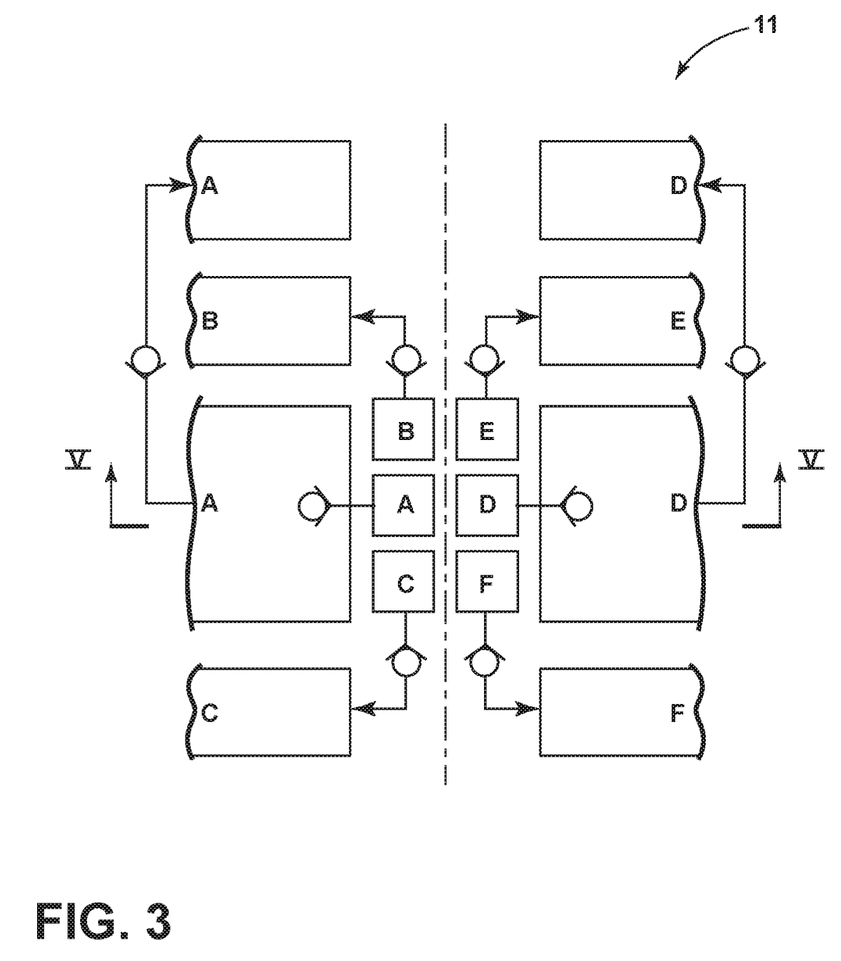
FIG. 3 is a detailed view of area III of FIG. 2.
Figure 4:
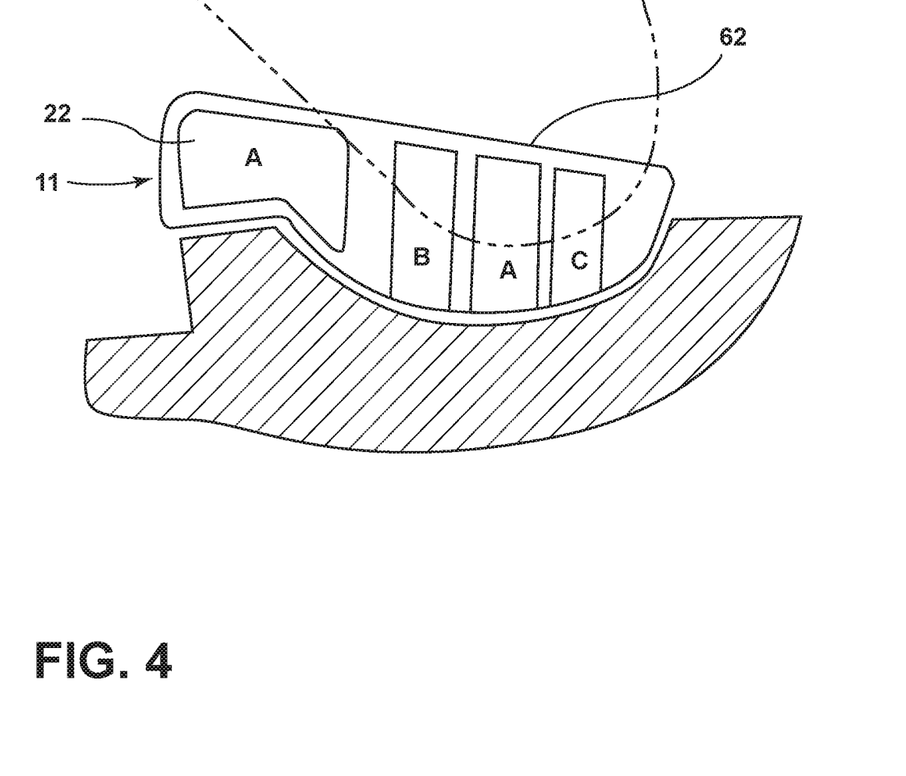
FIG. 4 is a side elevational cross-sectional view of an air cell arrangement for a vehicle seating assembly of the present disclosure.
Figure 7:
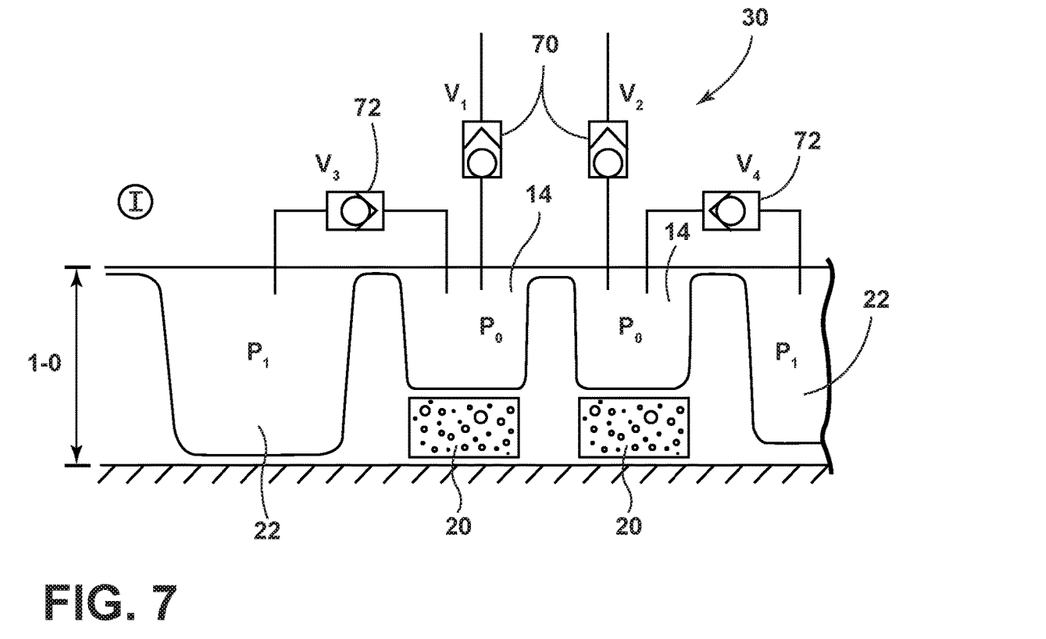
FIG. 7 is a side elevational cross-sectional view of an air cell arrangement with no loading on the air cells and further illustrating a check valve.

With reference now to FIGS. 2-4, the passive pressure recovery system 11 is located in an air suspended panel 60 in the vehicle seating assembly 10. As shown in FIGS. 2 and 4, the air suspended seat 12 includes a plurality of support cells disposed below a support surface 62. On the left side, a first cell A and a third cell A are operably linked. A second cell B and a fourth cell C are isolated and work independently from each other and from the first and third cells A, A, as shown in FIG. 3. In a similar fashion, cells D, D are operably linked via a check valve. Cells E and F are isolated and work independently from each other and from the first and third cells D and D (FIG. 7). Check valves enable intake of air into the support cells 14 when the air suspended seat 12 is unoccupied, and allow air to pass into the receiving cells 22 when the air suspended seat 12 is occupied.

Figure 5:
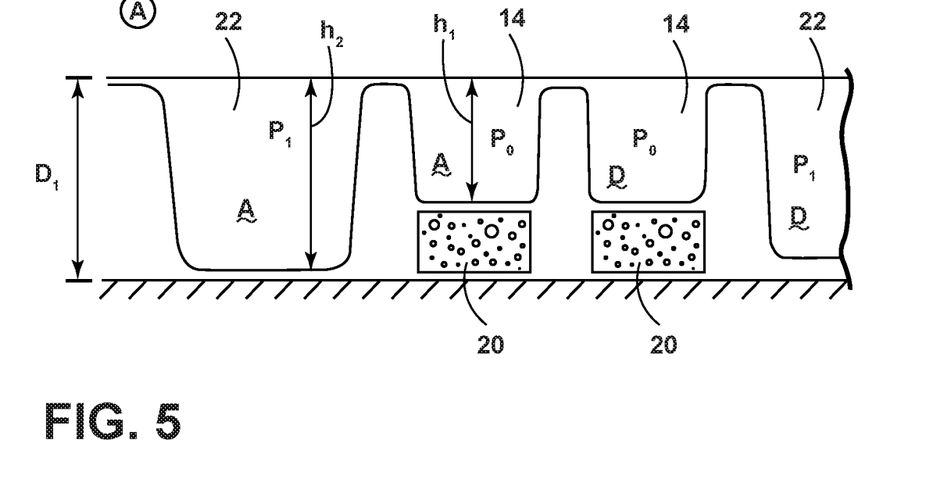
FIG. 5 is a side elevational cross-sectional view of an air cell arrangement with no loading on the air cells.
Figure 6:
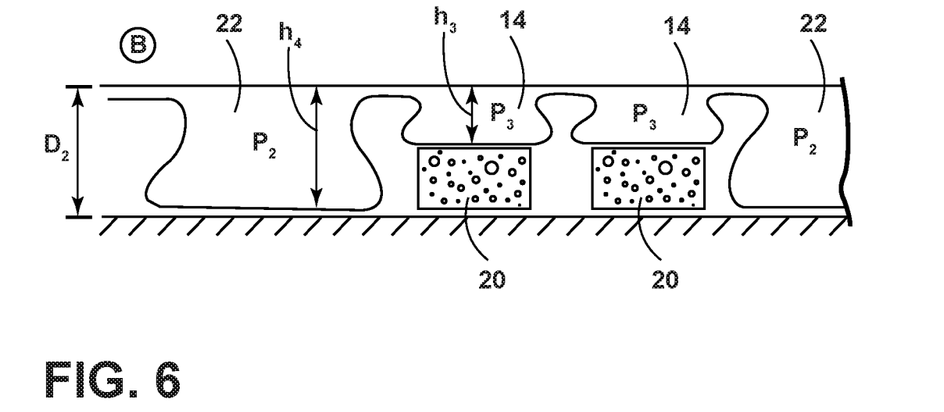
FIG. 6 is a side elevational cross-sectional view of an air cell arrangement with loading on the air cells.

With reference now to FIG. 5, a pressure $P_0$ of the support cell 14 is approximately equal to a pressure $P_1$ of the receiving cell 22. In this instance, there is no occupant on the vehicle seating assembly 10. Accordingly, there is no pressure applied to the support surface 62. Also, as shown in FIG. 5, the support blocks 20 are located below the support cells 14. Thus, the cell height $h_1$ of the support cells 14 is less than the height $h_2$ of the receiving cells 22.

With reference now to FIGS. 5-8, the support cells 14 stand on non-resilient blocks of expanded polypropylene (EPP) or other low cost, low weight material. The blocks ensure that as a top surface of the air suspended seat 12 is compressed downward by the weight of an occupant, the percent compression of the support cells 14 is greater than that of the receiving cells 22. This is as a result of the cell height $h_1$ of the support cells 14 being less than the cell height $h_2$ of the receiving cells 22. This is true even though the deflection distance $D_2$ is the same. Indeed, the support cells 14 and the receiving cells 22 move from deflection $D_1$ when no load is applied to $D_2$ when a load (likely an occupant) is applied. The resulting pressure in the support cells 14 is 1.25 times that of the receiving cells 22. Air continues to migrate from the support cells 14 to the receiving cells 22 until the pressure has stabilized at 1.25 times the base design pressure, at which point the receiving cells 22 oppose further inflation.

Figure 8:
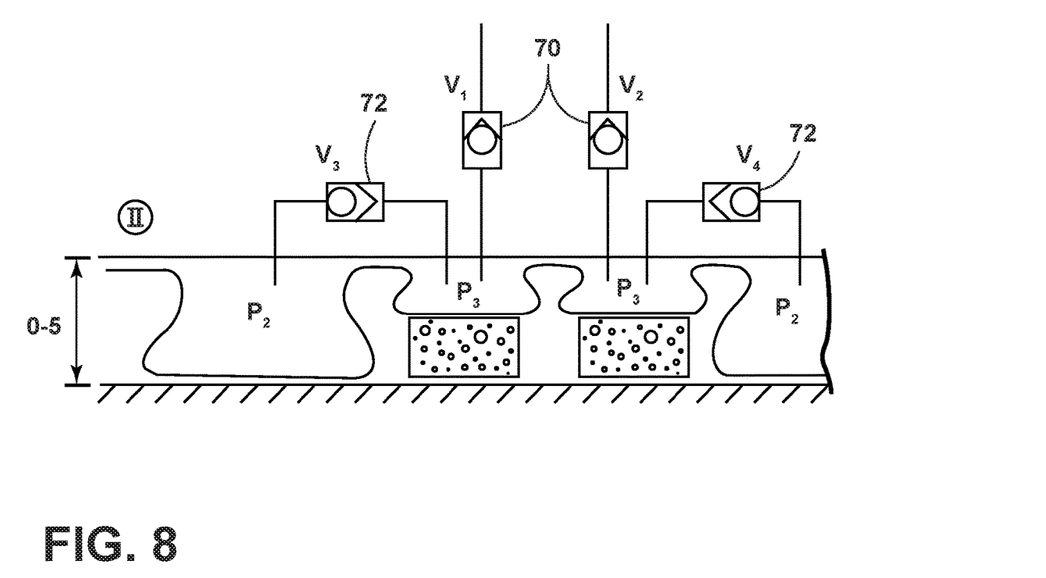
FIG. 8 is a side elevational cross-sectional view of an air cell arrangement with loading on the air cells and further illustrating a check valve.

With reference now to FIGS. 7 and 8, if the air suspended seat 12 is over-deflected by extreme jounce conditions, the passive pressure recovery system 11 will be able to over-pressurize the receiving cells 22 to some extent. However, the over-pressure condition is minimal and will self-correct as the passive pressure recovery system 11 is generally unable to push additional air into the receiving cell 22 once overall pressure of the support cell 14 has attained 1.25 times the normal design pressure. The 25 percent over-pressure ensures that an adequate volume of replenishing air is available to correct the pressure loss of the receiving cell 22 and replenish the support cells 14 each time the air suspended seat 12 is occupied. The check valves, as previously noted, enable the intake of air into the support cells 14 when the air suspended seat 12 is unoccupied, and allow air to pass into the receiving cells 22 when the support pressure is higher (occupied). The check valve system 30 includes at least one external check valve 70 that allows air to be drawn into at least one support cell 14 from the environment when the load (likely an occupant) has been removed from the support cell 14. The check valve system 30 also includes a receiving cell check valve 72 configured to prevent movement of air from the receiving cell 22 to the support cell 14 when the load has been removed from the support cell 14 and the receiving cell 22. Although the term "air" has been used herein, it will be understood, that other mediums that are fluid in nature and that can pass easily into the vehicle seating assembly 10 could also be utilized. However, the medium surrounding the air suspended seat 11 is usually the most convenient, in this case, air.

The system as set forth herein provides a passive pressure recovery system that does not require electrically powered air compression devices or manual air compression devices. In addition, the passive pressure recovery system as set forth herein is generally integral with the vehicle seating assembly. The air suspended nature of the system as set forth herein is advantageous to implement due to minimal costs and avoidance of subsystems needing power, control, packaging, additional cost, and excessive weight.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A passive pressure recovery system for an air suspended seat comprising:
    a fluid tight support cell;
    a trim stock disposed over the fluid tight support cell;
    a support block disposed below the support cell;
    a fluid tight receiving cell in fluid communication with the support cell and configured to receive fluid from the support cell when a load is applied to the support cell;
    a check valve system comprising a first check valve in fluid communication with the support cell and configured to passively allow air to be drawn into the support cell when the load has been removed from the support cell and a second check valve providing the fluid communication between the support cell and the receiving cell such that air is precluded from returning from the receiving cell into the support cell, wherein the support cell and the receiving cell form at least part of the air suspended seat; and
    wherein the receiving cell and the support cell are configured to be deflected simultaneously a similar distance when the load is applied, resulting in a greater pressure in the support cells than in the receiving cells.

2. The passive pressure recovery system of claim 1, wherein the first check valve comprises an external check valve that allows air to be drawn into the support cell from the environment when the load has been removed from the support cell.

3. The passive pressure recovery system of claim 1, wherein the pressure into the support cell is at least 25% greater in the support cells than in the receiving cells when a load is placed on the support cells.

4. The passive pressure recovery system of claim 1, wherein a height of the support cell is less than a height of the receiving cell.

5. The passive pressure recovery system of claim 1, wherein the support cell is one of a plurality of support cells that are disposed proximate a rear portion of the air suspended seat and the receiving cell is one of a plurality of receiving cells that are disposed at a forward portion of the air suspended seat.

6. The passive pressure recovery system of claim 1, wherein a deflection distance of the support cell and a deflection distance of the receiving cell are approximately equal.

7. A passive pressure vehicle seating assembly comprising: an air suspended seat comprising:
    fluid tight support cells;
    a support block disposed below each support cell;
    fluid tight receiving cells; and
    a check valve system comprising a receiving cell check valve configured to receive fluid from the support cells and to direct the fluid into the receiving cells when a load is applied to the support cells, a pressure in the support cells being greater than wherein the receiving cell check valve precludes air from returning from the receiving cell into the support cell, the check valve system comprising an external check valve in fluid communication with the support cells and configured to passively allow air to be drawn into the support cells when the load has been removed from the support cells; and wherein the receiving cells and the support cells are configured to be deflected simultaneously a similar distance when the load is applied, resulting in a greater pressure in the support cells than in the receiving cells.

8. The passive pressure vehicle seating assembly of claim 7, wherein the external check valve allows air to be drawn into the support cell from the environment when the load has been removed from the support cell.

9. The passive pressure vehicle seating assembly of claim 7, wherein the pressure into the support cell is at least 25% greater in the support cells than in the receiving cells when a load is placed on the support cells.

10. The passive pressure vehicle seating assembly of claim 7, wherein a height of the support cells is less than a height of the receiving cells.

11. The passive pressure vehicle seating assembly of claim 7, wherein the support cells are disposed proximate a rear portion of the air suspended seat and the receiving cells are disposed at a forward portion of the air suspended seat.

12. The passive pressure vehicle seating assembly of claim 7, wherein a deflection distance of the support cells and a deflection distance of the receiving cells are approximately equal.

13. A seating assembly comprising: an air suspended seat comprising:
   a passive pressure recovery device including a fluid tight support cell disposed on a support block;
   a fluid tight receiving cell; a first check valve in fluid communication with the support cell and configured to passively allow air to be drawn into the support cells when a load has been removed from the air suspension seat; and
   a fluid line having a second check valve disposed therein and coupling the support cell with the receiving cell, wherein the receiving cell and the support cell are configured to be deflected simultaneously a similar distance when the load is applied, resulting in a greater pressure in the support cell than in the receiving cell, and wherein the second check valve is configured to limit flow to one-way flow from the support cell into the receiving cell.

14. The seating assembly of claim 13, wherein a height of the support cell is less than a height of the receiving cell.

15. The seating assembly of claim 13, wherein the support cell is one of a plurality of support cells that are disposed proximate a rear portion of the air suspended seat and the receiving cell is one of a plurality of receiving cells that are disposed at a forward portion of the air suspended seat.

16. The seating assembly of claim 13, wherein a deflection distance of the support cell and a deflection distance of the receiving cell are approximately equal.

* * * * *

UNITED STATES PATENT AND TRADEMARK OFFICE
CERTIFICATE OF CORRECTION

| | | |
|---|---|---|
| PATENT NO. | : 10,086,730 B2 | Page 1 of 1 |
| APPLICATION NO. | : 15/279167 | |
| DATED | : October 2, 2018 | |
| INVENTOR(S) | : Dry | |

It is certified that error appears in the above-identified patent and that said Letters Patent is hereby corrected as shown below:

In the Claims

Column 6:
Claim 7, Lines 63-64;
Delete "a pressure in the support cells being greater than".

Signed and Sealed this
First Day of January, 2019

Andrei Iancu
*Director of the United States Patent and Trademark Office*